United States Patent
Kenington

(10) Patent No.: US 8,339,216 B2
(45) Date of Patent: Dec. 25, 2012

(54) DUPLEXER AND METHOD FOR SEPARATING A TRANSMIT SIGNAL AND A RECEIVE SIGNAL

(75) Inventor: Peter Kenington, Chepstow (GB)

(73) Assignee: Ubidyne, Inc., Wilmington, DE (US)

(*) Notice: Subject to any disclaimer, the term of this patent is extended or adjusted under 35 U.S.C. 154(b) by 501 days.

(21) Appl. No.: 12/571,727

(22) Filed: Oct. 1, 2009

(65) Prior Publication Data

US 2011/0080856 A1 Apr. 7, 2011

(51) Int. Cl.
*H01P 5/16* (2006.01)
*H03H 7/46* (2006.01)
*H03H 7/54* (2006.01)
*H04B 1/50* (2006.01)
*H04B 1/10* (2006.01)
*H03H 9/64* (2006.01)

(52) U.S. Cl. ........ 333/126; 333/129; 333/132; 333/133; 455/78; 455/82; 455/213; 455/307; 370/278; 370/282

(58) Field of Classification Search .................. 333/117, 333/118, 124–129, 132–136, 175, 176, 185–187, 333/189, 193, 194, 195; 455/78, 82, 212, 455/213, 296, 307; 370/201, 278, 282
See application file for complete search history.

(56) References Cited

U.S. PATENT DOCUMENTS

| | | | |
|---|---|---|---|
| 3,587,009 A | | 6/1971 | Kibler |
| 3,988,705 A | * | 10/1976 | Drapac ........................ 333/109 |
| 4,292,607 A | | 9/1981 | Goldie et al. |
| 4,538,123 A | | 8/1985 | Mariani et al. |
| 4,694,266 A | * | 9/1987 | Wright ........................ 333/196 |
| 4,963,945 A | * | 10/1990 | Cooper et al. ................ 455/307 |
| 5,065,453 A | | 11/1991 | Thomas |
| 5,473,295 A | | 12/1995 | Turunen |
| 5,721,521 A | | 2/1998 | Drabeck et al. |

(Continued)

FOREIGN PATENT DOCUMENTS

EP 0 273 793 A1 * 7/1988

(Continued)

OTHER PUBLICATIONS

Jachowski, D.R.; "Passive Enhancement of Resonator Q in Microwave Notch Filters"; IEEE 2004 MTT-S International Microwave Symposium Digest, Jun. 6-11, 2004, pp. 1315-1318.*

(Continued)

*Primary Examiner* — Barbara Summons
(74) *Attorney, Agent, or Firm* — Stephen H. Eland; Dann, Dorfman, Herrell & Skillman

(57) ABSTRACT

The present disclosure provides a duplexer for separating a transmit signal and a receive signal. The duplexer comprises a transmit filter, a receive filter and an analogue quadrature splitter, a first filtering element and a second filtering element. By choosing the first filtering element and the second filtering element substantially identical, it is possible to transform filtering characteristics of the first and second filtering element such that stop bands are substantially transformed into an effective pass band, and vice versa. The analogue quadrature splitter is adapted to increase an attenuation of the transmit signals outside the transmit band, such as in the receive band. Therefore out-of-band emissions by the transmitter will be substantially reduced. The present disclosure further provides a method for separating a transmit signal and a receive signal, and computer program products for the manufacture for carrying out the method of separating transmit signals and receive signals.

20 Claims, 11 Drawing Sheets

U.S. PATENT DOCUMENTS

| | | | |
|---|---|---|---|
| 5,894,251 A * | 4/1999 | Taguchi et al. | 333/193 |
| 6,201,457 B1 * | 3/2001 | Hickernell | 333/193 |
| 6,374,094 B1 | 4/2002 | Zappala | |
| 6,768,396 B2 * | 7/2004 | Klee et al. | 333/187 |
| 6,934,562 B1 | 8/2005 | Wilding | |
| 7,038,557 B2 * | 5/2006 | Nakamura et al. | 333/132 |
| 7,437,139 B2 | 10/2008 | Lo et al. | |
| 8,013,690 B2 * | 9/2011 | Miyashiro | 333/176 |
| 2006/0019611 A1 * | 1/2006 | Mages | 455/73 |
| 2006/0152304 A1 * | 7/2006 | Liang et al. | 333/176 |
| 2009/0231058 A1 * | 9/2009 | Nishino et al. | 333/118 |
| 2009/0289744 A1 | 11/2009 | Miyashiro | |
| 2011/0080229 A1 | 4/2011 | Kenington | |
| 2011/0080856 A1 | 4/2011 | Kenington | |
| 2011/0081878 A1 | 4/2011 | Kenington | |

FOREIGN PATENT DOCUMENTS

| | | | |
|---|---|---|---|
| JP | 55-67201 | | 5/1980 |
| JP | 63-206029 | * | 8/1988 |
| JP | 9-284075 | | 10/1997 |
| JP | 2007-208350 | * | 8/2007 |
| WO | WO 2007/066426 A1 | * | 6/2007 |

OTHER PUBLICATIONS http://en.wikipedia.org/wiki/Duplexer; dated Jul. 28, 2009.
http://en.wikipedia.org/wiki/Diplexer; dated Jul. 28, 2009.
http://rfsolutions.com/duplex.htm; dated 1996-2005.
Wen et al, Suppression of Reflection Coefficients of Surface Acoustic Wave Filters Using Quadrature Hybrids; IEEE Transactions on Ultrasonics, Ferroelectrics and Frequency Control; ISSN 0885-3010, Oct. 2006, V. 53, No. 10, pp. 1912-1917.

* cited by examiner

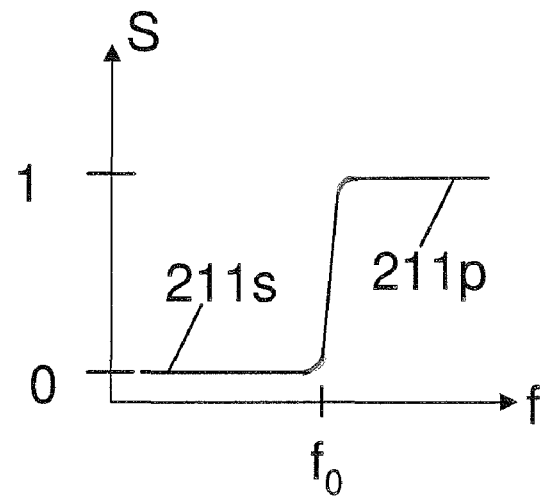
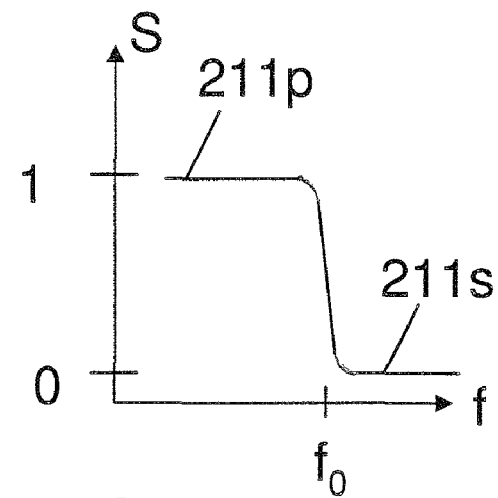
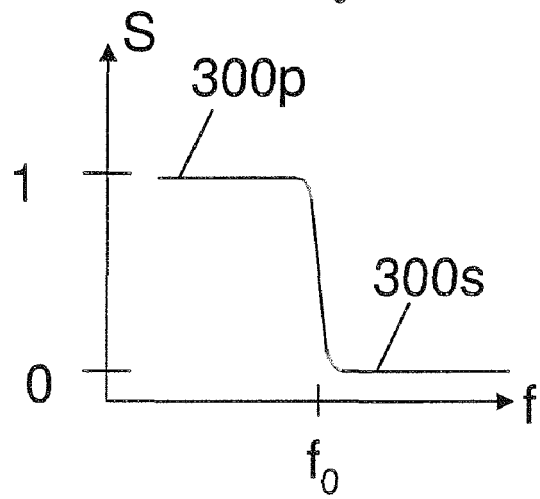
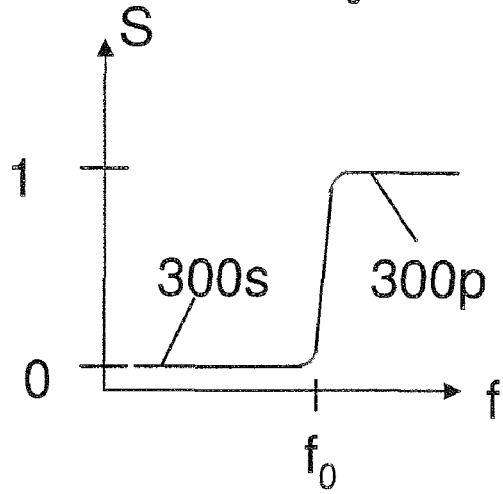
Figure 2bFigure 2c

DUPLEXER AND METHOD FOR SEPARATING A TRANSMIT SIGNAL AND A RECEIVE SIGNAL

CROSS REFERENCE TO OTHER APPLICATIONS

The present application is related to a U.S. patent application Ser. No. 12/571,808 entitled: "Filtering Device and a Method for Filtering a Signal" filed Oct. 1, 2009, and U.S. patent application Ser. No. 12/571,696 entitled: "Filtering Device for Filtering RF Signals and Method for Filtering RF Signals" filed Oct. 1, 2009. The entire disclosure of each of the foregoing applications is incorporated herein by reference.

FIELD OF THE INVENTION

The field of the present invention relates to a duplexer for separating a transmit signal and a receive signal using an analogue quadrature splitter to achieve an increased attenuation of the transmit signal outside a transmit band.

BACKGROUND OF THE INVENTION

There is a need in the field of radio frequency (RF) technology to provide a duplexer (or duplex filter) for separating a transmit signal Tx and a receive signal Rx. The duplexer needs to be cheap to design and manufacture. The duplexer needs also to be of high performance, i.e. able to separate with a high degree of precision the transmit signal Tx and the receive signal Rx. The duplexer needs to withstand high RF power levels, substantially in the range of the transmit power level. With the advent of mobile communications a frequency band of the transmit signal Tx and a frequency band of the receive signal Rx are closely spaced to each other, as will be explained below. This close spacing is generally termed to be "adjacent" transmit bands and receive bands. There is usually a small separation between the transmit band and the receive band to allow the Tx and Rx parts of the duplexer an area in which to 'roll-off'. For example, in the European 900 MHz E-GSM band, there is a 10 MHz gap between the top of the uplink (handset transmit) band and the bottom of the downlink (handset receive) band. A duplexer should provide a sharp separation of the transmit signal Tx and the receive signal Rx being relayed, i.e. transmitted and/or received at an antenna, for applications in which the transmit band and the receive band are closely-spaced.

Today's protocols for mobile communication require the sharp separation of the transmit signals Tx and the receive signals Rx, as transmit bands and receive bands are closely spaced to each other in terms of frequency. The duplexers used in mobile communications need to be adapted to handle the high transmit power levels of the transmit signal Tx and yet correctly separate the very small receive signal Rx. This is a requirement in mobile communication protocols, such as 3GPP or UMTS. The receive signal Rx typically is at a second power level. The second power level is substantially lower than the transmit power levels. Currently available duplexers that meet these requirements typically comprise large, expensive filters. Especially for applications requiring several duplexers, such as in an antenna array of a base station, the large and expensive filters may lead to high costs and a considerable size of the antenna array.

U.S. Pat. No. 5,473,295 (assigned to LK-Products OY, Finland) provides a SAW filter to a receive branch of a duplex filter. The provision of the SAW filter increases the stop band attenuation of the duplex filter. The SAW filter is configured as a notch filter. The SAW filter improves a rejection of a band pass filter in a mobile radio telephone.

Jiguo Wen, et al. disclose "Suppression of Reflection of Coefficients of Surface Acoustic Wave Filters Using Quadrature Hybrid" published in IEEE Transactions on Ultrasonics, Ferroelectrics and Frequency Control, Volume 53, issue 10, pages 1912-1917. The Wen paper describes the use of quadrature hybrids to improve the input and output matching characteristics of a pair of identical SAW filters. Two quadrature hybrids are described in the Hashimoto publication.

It is a problem with the prior art that the out-of-band power incident upon a SAW filter can be very high (several Watts to several tens of Watts), as typically the full power of the transmitter is incident upon the SAW. Generally the SAW filters and SAW devices are limited in their capability to handle high out-of-band power levels. For example, the EPCOS B7642 SAW Duplexer is adapted to handle 1 Watt of transmit power, but only 10 Milliwatts of out of band power.

Furthermore it is difficult in the prior art to achieve a good RF power match (also termed matching) between an output of the transmitter and the SAW device and/or SAW duplexer, if transition bands of the duplexer's transmit filter and the SAW filter are close or overlapping, as is described in the LK-Products patent. Close spacing and/or even overlapping of the transition bands is desired for the duplexers in the field of mobile communication. A poor match results in poor Tx output power performance. Furthermore the poor match typically causes a poor phase response. The poor phase response results in poor transmit signal quality together with a high error-vector magnitude (EVM).

SUMMARY OF THE INVENTION

The present disclosure teaches a duplexer for separating a transmit signal and a receive signal. The duplexer comprises a transmit filter, a receive filter, an analogue quadrature splitter, a first filtering element and a second filtering element. The transmit filter substantially forwards the transmit signal within an at least one transmit band to an antenna. The receive filter substantially forwards a receive signal within at least one receive band from the antenna to a receive path. The analogue quadrature splitter is adapted to split the transmit signal into an in phase component and a quadrature component. The first filtering element has a first filtering characteristic. The first filtering characteristic comprises at least one first pass band and at least one first stop band. The second filtering element has a second filtering characteristic. The second filtering characteristic comprises at least one second pass band and at least one second stop band. The analogue quadrature splitter is adapted to increase an attenuation of the transmit signal outside of the at least one transmit band.

The first filtering element and the second filtering element may be of high performance with respect to a precision in filtering, such as a steep roll-off. Typically the first filtering element and the second filtering element are cheap to manufacture but do not withstand signals at the transmit power level. The present disclosure provides the high performance with respect to the precision in filtering of the first filtering element and the second filtering element whilst also allowing the first filtering element and the second filtering element to withstand the transmit power level. The present disclosure further permits usage of the first filtering elements and the second filtering elements having a small footprint even when faced with signals at the transmit power level.

It is further possible for the analogue quadrature splitter to increase an attenuation of the transmit signal within the at least one receive band. This is of interest when the at least one transmit band and the at least one receive band are closely-spaced or adjacent frequency bands.

It is to be understood that an increased attenuation of the transmit signal outside the transmit band will help to reduce out-of-band emissions caused by a poor performance of the transmitter or duplexer.

The term "closely-spaced frequency band" or "closely-spaced in frequency" used in this disclosure shall be understood as referring to a first frequency band and a second frequency band being separated in frequency such that a band of separation between the first and second frequency band is considerably smaller than a width of the first frequency band or a width of the second frequency band. For example in mobile communications the first frequency band may be, for example, 35 MHz wide and the second frequency band may be 35 MHz wide. A width of separation between the receive band and the transmit band typically lies in the range of 10 MHz in modern protocols for mobile communication. Therefore the transmit signal Tx and the receive signal Rx are closely-spaced in frequency in the modern protocols for mobile communication.

The present disclosure further provides a method for separating a transmit signal Tx and a receive signal Rx. The method comprises a step of forwarding the transmit signal Tx within at least one transmit band in a transmit direction. The method further comprises forwarding a receive signal Rx within at least one receive band in a receive direction. The method also comprises a splitting of the transmit signal Tx into an in phase component I and a quadrature component Q. The method further comprises a filtering of at least one of the in phase component I or the quadrature component Q. The filtering increases an attenuation of the transmit signal Tx outside the transmit band. This has the advantage that the increased attenuation of the transmit signal Tx outside the transmit band will improve a signal to noise ratio of the receive signal Rx. Likewise the increased attenuation of the transmit signal Tx outside the transmit band will reduce out-of-band emissions for the transmit signal Tx.

The present disclosure further provides a computer program product embodied on a computer readable medium and the computer readable medium comprising executable instructions for the execution of a manufacture of a duplexer for separating a transmit signal Tx and a receive signal Rx.

The present disclosure further teaches a computer program product embodied on a computer-readable medium and the computer-readable medium comprises executable instructions for the execution of a method of separating a transmit signal Tx and a receive signal Rx.

BRIEF DESCRIPTION OF THE DRAWINGS

FIG. 2b shows a transformation of a high pass into a low pass.

FIG. 2c shows a transformation of filtering characteristics.

DETAILED DESCRIPTION OF THE INVENTION

For a better understanding of the present disclosure reference shall now be made to a preferred aspect of the present disclosure, examples of which are illustrated in the accompanying drawings. It will be understood that the embodiments and aspects of the invention described herein are only examples and do not limit the protective scope of the claims in any way. The invention is defined by the claims and their equivalents. It will also be understood that features of one aspect can be combined with features of different aspects.

Figure 1:
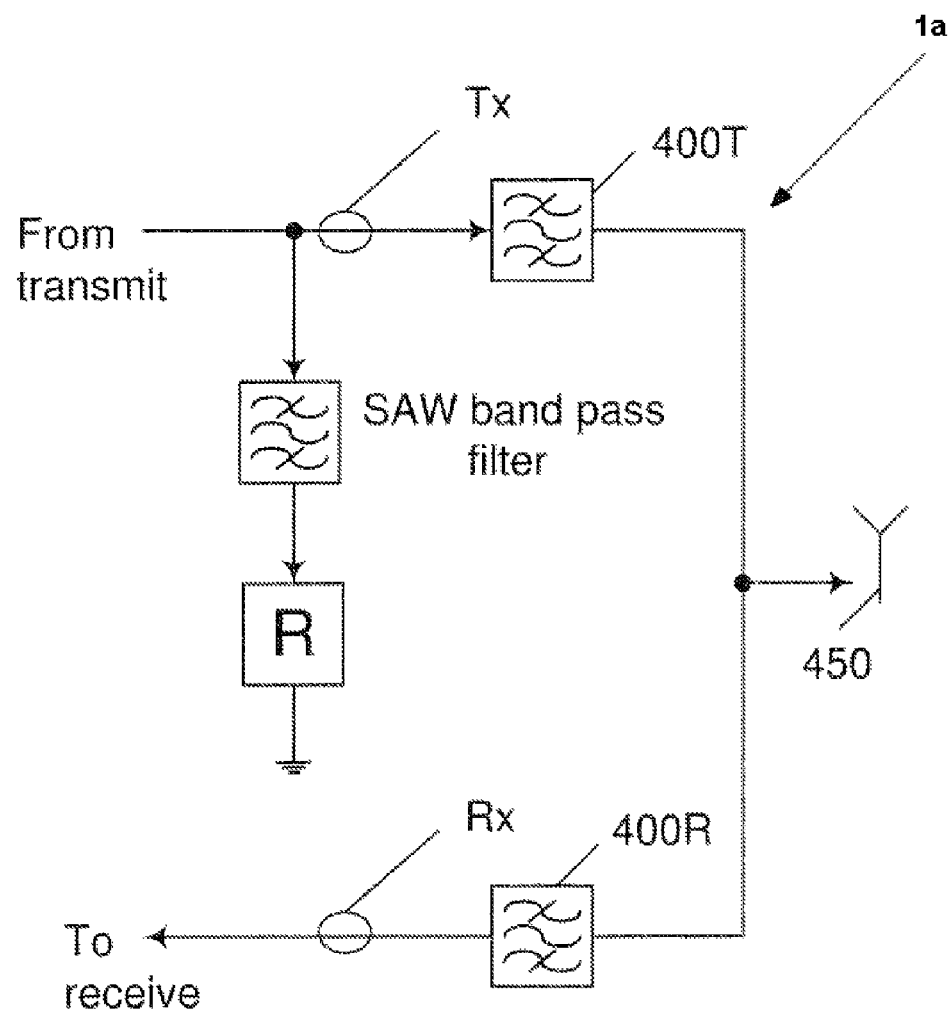
FIG. 1 shows a duplexer according to the prior art.

FIG. 1 shows an example of a duplexer 1a as it is known in the art. The duplexer 1a is used for separating a transmit signal Tx in a transmit band 300Tx and a receive signal Rx in a receive band 300Rx. The duplexer 1a separates two signals in distinct frequency bands. This separation allows the use of the same cable for more than one channel, for example a transmit channel and a receive channel. The duplexer 1a ends at a common antenna 450 as depicted in FIG. 1. If instead both of the signals are separated again into individual antennas and/or cables at the end of the duplexer 1a, such a setup is called a diplexer. The duplexer 1a in FIG. 1 comprises a transmit filter 400T. The transmit filter 400T is a band pass filter, adapted to withstand transmit signals Tx from a transmitter (not shown) in a first power range, for example several Watts up to several hundred Watts. The transmit filter 400T forwards the transmit signal Tx from the transmitter to the antenna 450. The transmit signals travelling from the transmitter via the transmit filter 400T, reaching the antenna 450 are travelling in a transmit direction. The transmit filter 400T is used to ensure that the transmit signal Tx comprises signal components only within the transmit band 300Tx. A restriction to those signal components of the transmit signal Tx within the transmit band 300Tx is of interest in order to reduce out-of-band emissions.

The duplexer 1a of FIG. 1 further comprises a receive filter 400R. The receive filter 400R forwards a receive signal Rx from the antenna 450 to a receiver (not shown) in a receive direction. The receive filter 400R forwards only components of the receive signal Rx within a receive band 300Rx. In a typical application the transmit band 300Tx and the receive band 300Rx are of different frequencies. In today's mobile communication, it is common for the transmit band 300Tx and the receive band 300Rx to be separated by only a few Megahertz in frequency, in other words the transmit band 300Tx and the receive band 300Rx are closely-spaced in frequency with the transmit band 300Tx and/or the receive band 300Rx each being about 35 MHz wide. In extreme cases the transmit band 300Tx and the receive band Rx may even be overlapping frequency bands.

The transmit filter 400T further serves the purpose of protecting the transmitter (not shown) from any transmit power being received by the antenna and then being fed back into the transmitter. This may, for example, happen in cases where a second transmitter is feeding signals to an adjacent antenna, where mast or site sharing is taking place. It is known in the art that even small power levels being fed into the output of the transmitter will most likely cause the the transmitter to increase its undesired spectral emissions. Similarly the duplexer 1a will forward all RF power of a receive signal Rx into a receive branch (not shown—indicated as "To receive" in FIG. 1) by the receive filter 400R. If the transmit band 300Tx and the receive band 300Rx are closely-spaced, it may be of interest to reduce the transmitter's out-of-band power falling within the receive band 300Rx.

One option to provide a reduction (or an attenuation) of signal power in the transmit Tx signal within the receive band 300Rx, is to provide a surface acoustic wave (SAW) band pass filter upstream of the transmit filter 400T connected to a load R. It is to be understood that the SAW band pass filter may be chosen such that a notch filter centred at the receive band 300Rx is formed. The use of the SAW filter may be of interest because it provides a high performance filtering characteristic. In the setup of FIG. 1 an out-of-band power incident upon the SAW filter may be very high. Typically the SAW filter will "see" the full transmit power of the transmitter. Typically SAW filters are limited in their ability to handle high out-of-band power levels. For example the EPCOS B7642 SAW duplexer is adapted to handle 1 Watts of transmits power, but only 10 milliwatts of out-of-band power. The setup as shown in FIG. 1 has a further disadvantage. It is very difficult to achieve a good RF power matching between the transmitter output and the SAW filter. This holds true if the transition bands, i.e. rising or falling edges limiting the transmit band 300Tx, and the edges of the SAW band pass filter are close or even overlapping. In mobile communications one may typically face such a situation. A poor RF power matching of the transmitter output and the SAW filter will deteriorate the transmit power performance of the transmitter. In other words only a portion of the full transmit power of the transmitter will be forwarded to the antenna 450 for relaying. The poor RF power matching will be noticeable in the regions of the transition bands limiting the transmit band 300Tx of the transmit filter 400T and/or the edges limiting the pass band of the transmit filter 400T. The poor RF power matching may further result in a poor phase response. The poor phase response may lead to a poor signal quality provided to subscribers and a high error-vector magnitude (EVM).

Figure 2A:
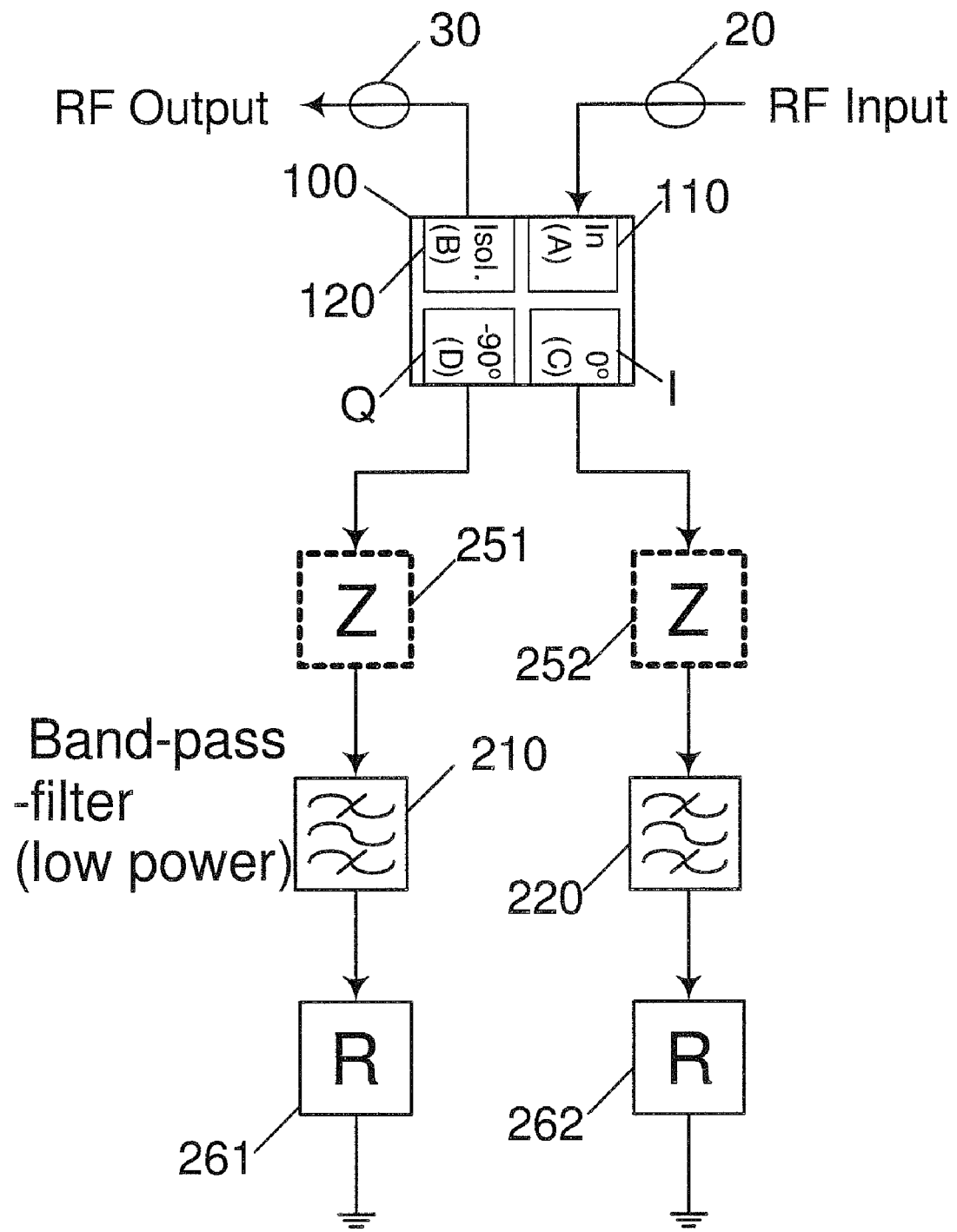
FIG. 2a shows details of a duplexer according to the present disclosure.

The invention of the present disclosure helps in overcoming these deficits. The SAW filter of FIG. 1 is replaced with an analogue quadrature splitter 100 as is shown in FIG. 2a. The analogue quadrature splitter 100 has an RF input 110 to accept an input signal 20 at the analogue quadrature splitter 100. The analogue quadrature splitter 100 provides a separation of the input signal 20 into an in phase component I and a quadrature component Q. It is to be understood that the analogue quadrature splitter 100 provides the separation equally in power for the in phase component I and the quadrature component Q. The analogue quadrature splitter 100 may be based on a stripline, a microstrip, a lumped-element equivalent, a transformer-based hybrid (i.e. a quadrature hybrid), etc. Other continuous-time (analogue) methods of achieving quadrature may also be applicable. A duplexer 1a as known in the prior art will provide the separation only based upon frequency. The in phase component I is forwarded to an optional matching network 252. The matching network 252 may be necessary in order to provide a good match to a second filtering element 220. The second filtering element 220 comprises a second filtering characteristic. The second filtering characteristic comprises at least one second pass band 222p and at least one second stop band 222s. It is to be understood that all components of the in phase component I are forwarded to a load 262 within the second pass band 222p of the second filtering element 220. It is to be understood that there could be more than one second pass band 222p within the second filtering characteristic. Filtering characteristics comprising stop bands and pass bands will be explained with FIG. 2b-2d.

The quadrature component Q is forwarded to a first matching network 251. As noted previously, the first matching network 251 is used to provide a good match for the quadrature component Q to an impedance required by a first filtering element 210. The first filtering element 210 comprises a first filtering characteristic. The first filtering characteristic comprises a first pass band 211p and a first stop band 211s. It is to be understood that there could be more than one first pass band 211p. Likewise there could be more than one first stop band 211s. Signal components of the quadrature component Q within the first pass band 211p of the first filtering element 210 will be forwarded to a first load 261. In other words, substantially all signal components within the first pass band 211p and/or the second pass band 222p will be "dumped" in the first load 261 and the second load 262 and hence disappear. It is of interest to provide the first filtering element 210 and the second filtering element 220 of identical filtering characteristics, as will be explained with respect to FIG. 2d. Let us consider signal components of the in phase component I within the second stop band 222s of the second filtering element 220. The signal components within the stop band 222s will be rejected back into the in phase component I of the analogue quadrature splitter 100. Likewise portions of the input signal 20 of the quadrature component Q within the stop bands 211s of the first filtering elements 210 will not be forwarded to the first load 261 but reflected back to the first matching network 251 and hence into the analogue quadrature splitter 100.

An additional matching network (not shown) may also be provided between the first filtering element and the first load 261. Likewise, another additional matching network (not shown) may be provided between the second filtering element 220 and the second load 262. The additional matching network and the further additional matching network may improve the match between the filtering elements 210 and 220 and their associated loads, thereby maximising the transfer ("dumping") of the unwanted receive-band power into the loads.

In general a fourth port, called isolation 120, is typically terminated with a defined load, for example 50 ohms. For the present disclosure this fourth port 120 is left open and provides an output signal 30 of the analogue quadrature splitter 100. Those components of the input signal 20 that have been rejected at the first filtering element 210 and/or the second filtering element 220 are reflected as an output signal 30 of the analogue quadrature splitter 100. The output signal 30 comprises a filtering characteristic that has substantially been transformed.

FIG. 2b shows in an upper half a transfer function S of a high-pass filtering element (also termed high pass). The high-pass filtering element comprises a first stop band 211s below a transition frequency $f_0$ and a first pass band 211p above the transition frequency $f_0$. If the high-pass filtering element is used as the first filtering element 210 and the second filtering element 220 in combination with the analogue quadrature splitter 100 (see FIG. 2a), the high-pass filtering characteristics will be transformed. The first pass band 211p is substantially transformed into a first stop band 300s. The first stop band 211s is instead substantially transformed into a first pass band 300p, as depicted in the lower half of FIG. 1b. The analogue quadrature splitter 100, as used in the present disclosure, substantially transforms the stop bands 211s of a low-power, high-accuracy filter element, such as the SAW filter, into pass bands 211p of a filtering characteristic and is capable of filtering high-power signals at the input 110 of the analogue quadrature splitter 100. It is to be understood that the transforming of the filtering characteristics may comprise additional ripple in the transformed filtering characteristics. The additional ripple is not shown within FIGS. 2b-2d for the sake of clarity.

FIG. 2c shows in an upper half a low-pass filtering characteristic comprising a first pass band 211p below a transition frequency $f_0$ and first stop band 211s above the transition frequency $f_0$. When using the low pass filtering characteristic (also termed low pass) in combination with the analogue quadrature splitter 100 of FIG. 2a replacing the first filtering element 210 and the second filtering element 220, the first pass band 211s will be substantially transformed into the stop band 300s. The first stop band 211s will be substantially transformed into the pass band 300p. The lower half of FIG. 2c shows the transformed filtering characteristic comprising an effective stop band 300s below the transition frequency $f_0$ and an effective pass band 300p above the transition frequency $f_0$. It is to be understood that a plurality of further filtering characteristics may be derived from a combination of the low pass and the high pass depicted in FIGS. 2b and 2c. Likewise a transformation of the further filtering characteristics, when used replacing the first filtering element 210 and the second filtering element 220 of FIG. 2a, may be derived from the transformations provided in the lower halves of FIGS. 2b and 2c. Examples of the further filtering characteristics are a band pass, a band stop, and a notch filter. It is to be understood that the examples of the further filtering elements are not limiting of the invention. The further filtering elements may be derived from the low pass and high pass characteristics shown in FIGS. 2b, 2c.

Figure 2D:
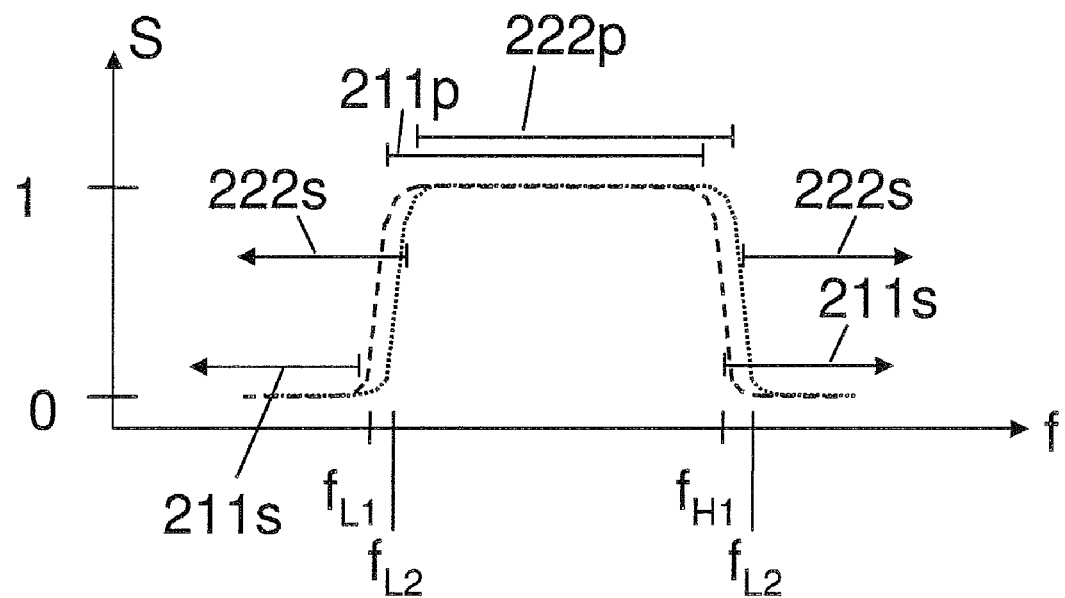
FIG. 2d shows a further transformation of filtering characteristics.
Figure 2D:
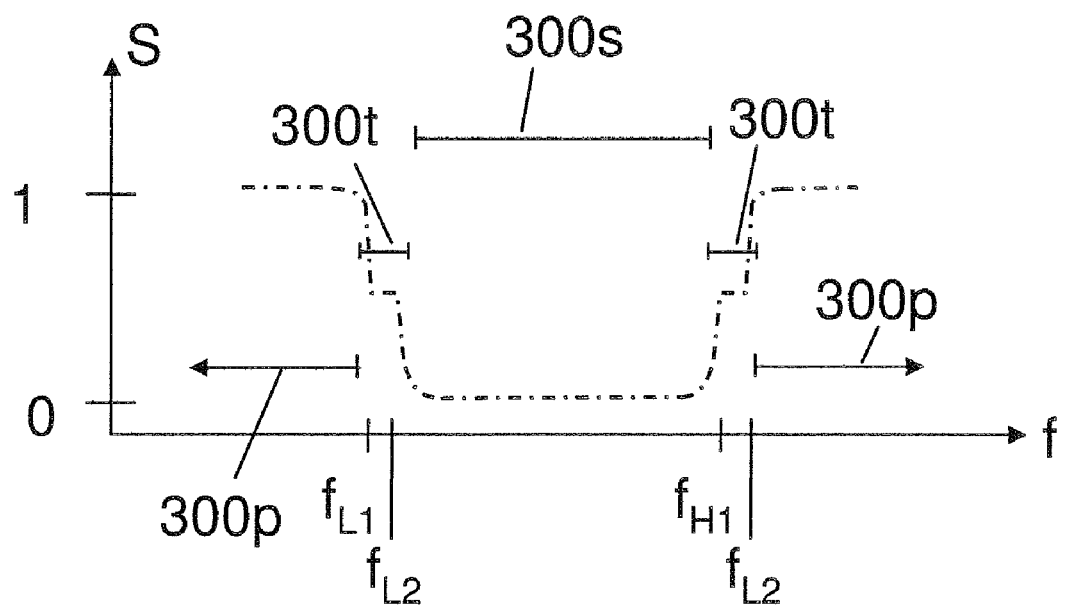

In FIG. 2d a use of the first filtering element 210 and the second filtering element 220 (see FIG. 2a) is depicted. The first filtering element 210 has a first filtering characteristic which is slightly different from the second filtering characteristic of the second filtering element 220. As was mentioned previously it is of interest to use the first filtering element 210 and the second filtering element 220 being of substantially identical filtering characteristics. FIG. 2d illustrates how filtering capabilities of the duplexer 1 incorporating the analogue quadrature splitter 100 become deteriorated when using the first filtering element 210 and the second filtering element 220 comprising slightly different filtering characteristics. FIG. 2d shows a first band pass from a first low frequency $f_{L1}$ up to a first high frequency $f_{H1}$ drawn in dashed line. FIG. 2d also shows a second band pass from a second lower frequency $f_{L2}$ to a second high frequency $f_{H2}$ drawn in dotted line. If the filtering characteristics, as depicted in the upper half of FIG. 2d, were used in connection with the analogue quadrature splitter 100 according to the present disclosure, a general filtering characteristic present within the output signal 30 would be deteriorated. This can be seen in the lower half of FIG. 2d. Instead of a steep transition between the effective pass band 300p and the effective stop band 300s a transition band 300t can be observed. The transition band 300t extends between the first low frequency $f_{L1}$ and the second low frequency $f_{L2}$ as well as between the first high frequency $f_{H1}$ and the second high frequency $f_{H2}$. In other words, the transition band 300t represents the portion(s) of the frequency domain in which the first filtering characteristic differs from the second filtering characteristic. In the transition band 300t the effective filter characteristic shows a medium attenuation. It will therefore be appreciated from FIG. 2d why it is of interest for the present disclosure to provide the first filtering element 210 and the second filtering element 220 of substantially identical filtering characteristics.

The first filtering characteristic of the first filtering element 210 may exhibit a temperature dependency. Likewise, the second filtering characteristic of the second filtering element 220 may exhibit a temperature dependency, too. The temperature dependencies of the filtering elements 210 and 220 might not be much of a problem when considered independently because care can be taken that an effect of the temperature dependency remains within reasonable limits. However, as explained above, an excessive discrepancy between the first filtering characteristic and the second filtering characteristic may adversely affect the filtering capabilities of the duplexer 1 when the temperature varies. These adverse effects may be reduced or avoided if the first filtering element 210 and the second filtering element 220 comprise a substantially identical response to temperature changes. The substantially identical response to temperature changes may be achieved if the first filtering element 210 and the second filtering element 220 are technologically similar, for example manufactured by means of the same technology and/or arranged on the same substrate. Another point to consider is that the first filtering element 210 and the second filtering element 220 should be exposed to the same temperature. This may be achieved by arranging the first filtering element and the second filtering element in close proximity to one other.

Figure 3A:
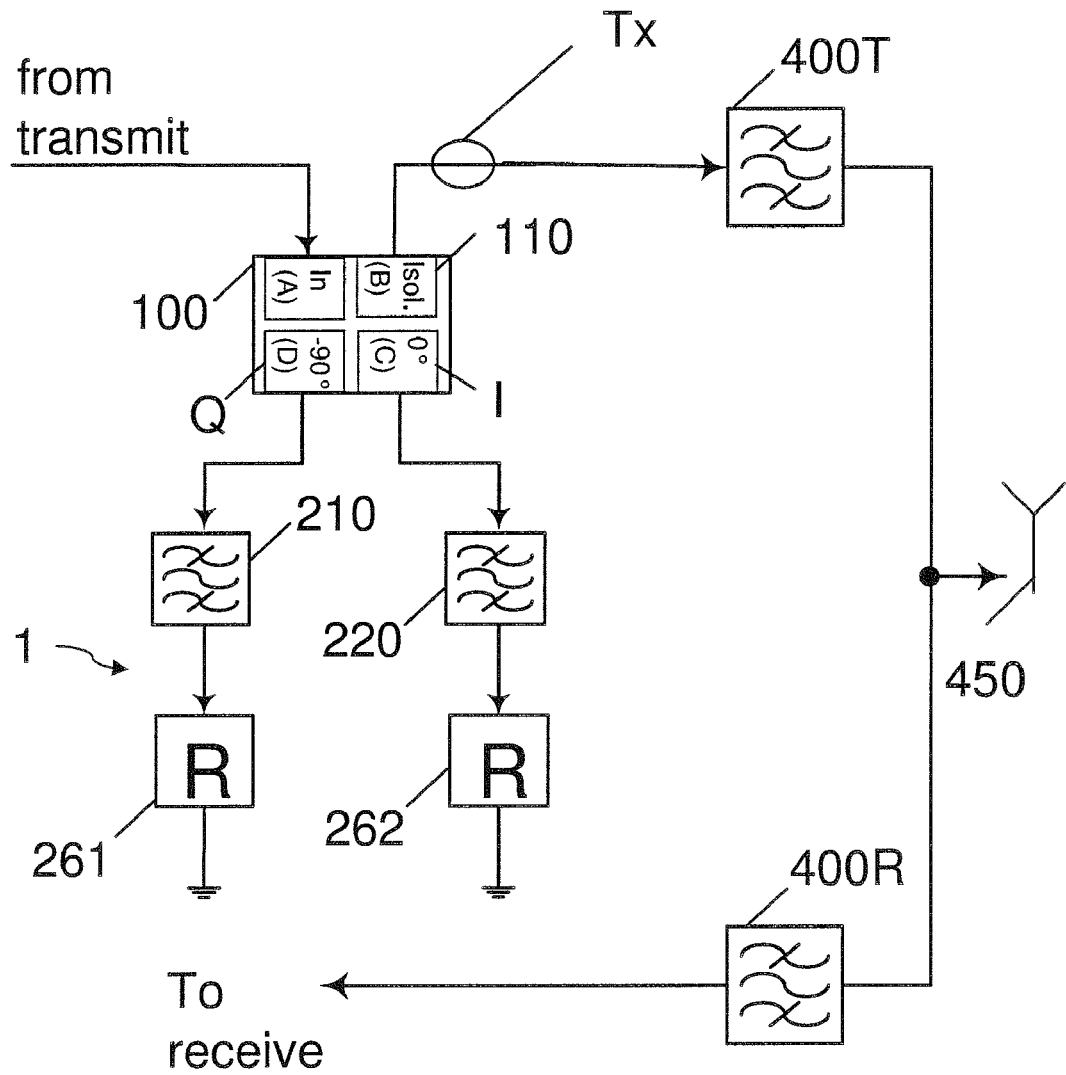
FIG. 3a shows the duplexer according to the present disclosure.

FIG. 3a shows a duplexer 1 according to the present disclosure. In FIG. 3a the analogue quadrature splitter 100 of FIG. 2a replaced the SAW band pass filter of FIG. 1. It will be discussed next how the duplexer 1, as shown in FIG. 3a, improves a performance of the duplexer 1 when used in combination with a transceiver, i.e. a transmit and a receive unit using a common antenna unit 450. It would be possible to use a set of antennas for reception and an individual antenna for transmission. The use of the only one antenna 450 as depicted in FIGS. 1 and 3 is not limiting of the present disclosure. It is to be noted that using the SAW filters for the first filtering element 210 and the second filtering element 220 is convenient, as the filtering characteristics of the SAW filters are of a high performance. In the setup shown in FIG. 3a and FIG. 2a the first filtering element 210 and the second filtering element 220 will not have to handle any significant power in their pass bands, when used at the output of a transmitter or other high power RF source. The term "high power RF source" shall be construed as meaning a RF source emitting power in the range of a few Watts up to 100's of Watts. The first filtering element 210 and the second filtering element 220 will not have to handle a significant power in their respective stop bands 211s, 222s. The first filtering element 210 and the second filtering element 220 will instead have to handle a significant voltage only. Therefore the setup comprising the analogue quadrature splitter 100 of the present disclosure as shown in FIG. 2a and FIG. 3a will overcome one of the draw backs of the prior art.

Figure 3B:
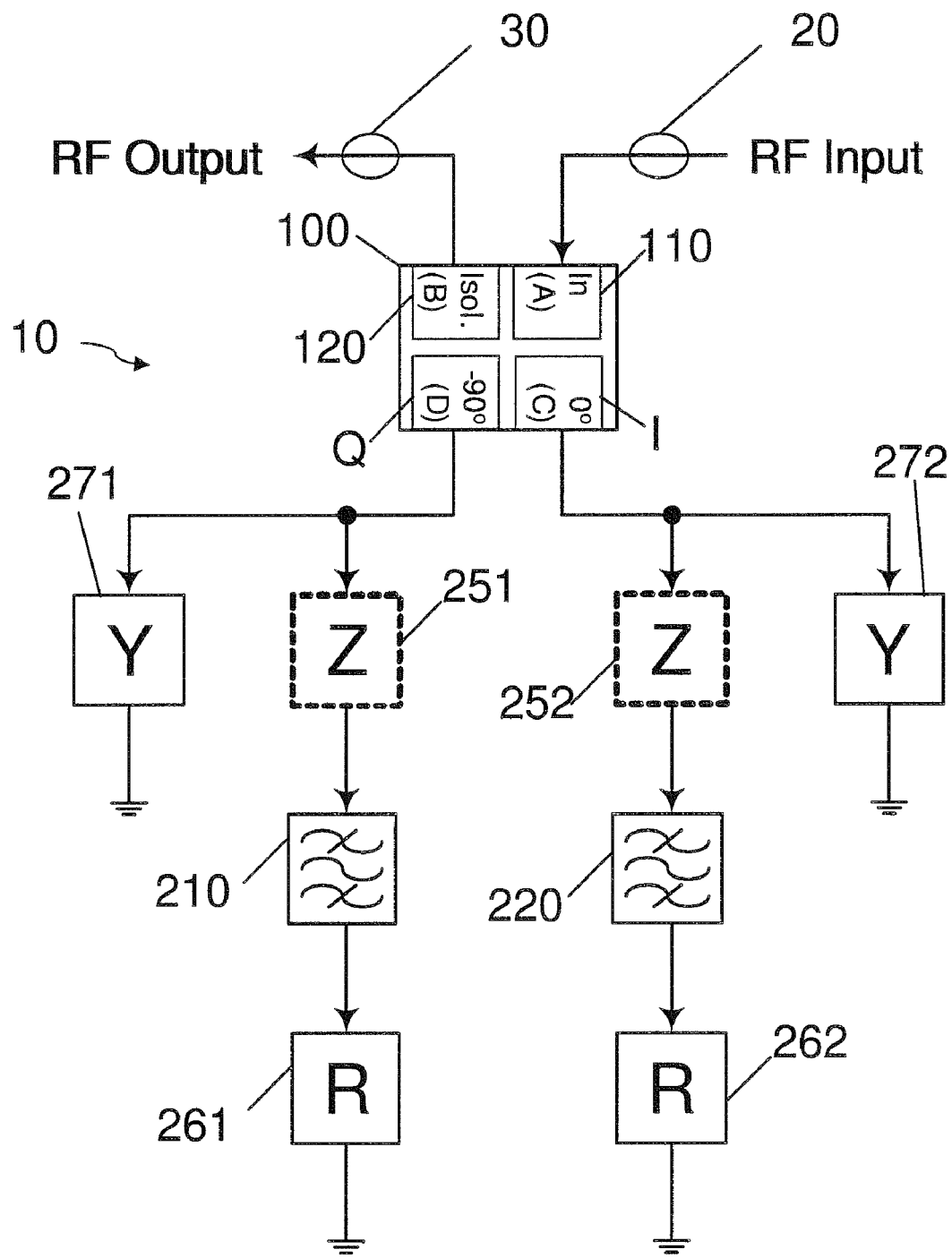
FIG. 3b shows another example of the duplexer comprising auxiliary matching networks.

It will be appreciated by a person skilled in the art that a region of transition from an effective stop band 300s of the first filtering element 210 and the second filtering element 220 to a general pass band 300p may comprise additional ripple in the general pass band 300p. Referring now to FIG. 3b, one option to reduce the additional ripple in the general pass band 300p is to provide an auxiliary matching network 271 to the first filtering element 210 and an auxiliary matching network 272 to the second filtering element 220. The first auxiliary matching network 271 and the second auxiliary matching network 272 should be chosen such that their respective impedance is lower than the impedance of the first filtering element 210 and the second filtering element 220. In regions of transitions and stop bands 211s, 222s of the first filtering element 210 and the second filtering element 220 group-delay characteristics and phase characteristics are typically poor. One finds substantial variations of the group-delay characteristics and the phase characteristics in a transition from the stop band 211s, 222s to the pass band 211p, 222p of the first filtering element and the second filtering element 210, 220. In combination with the analogue quadrature splitter 100, it may be necessary to provide a separate, benign matching network exhibiting a lower and smoother impedance than the first filtering element 210 and the second filtering element 220 within their stop bands 211s and 222s. The auxiliary impedance will dominate the impedance within the stop bands 211s, 222s of the first filtering element 210 and the second filtering element 220. Hence benign group-delay characteristics and/or phase characteristics in the pass bands 300p of the first filtering element 210 and the second filtering element 220 are yielded in combination with the analogue quadrature splitter 100. A person skilled in the art will appreciate that the first filtering element 210 and second filtering element 220 will almost appear as an open circuit, in their stop bands, in the case of the first filtering element 210 and the second filtering element 220 being implemented as SAW filters. Therefore providing the auxiliary matching networks 271 and 272 with benign impedance will dominate the group-delay characteristics and/or the phase characteristics of the first filtering element 210 and second filtering element 220, providing benign group-delay and/or phase characteristics. In consequence the auxiliary matching network provides smoother phase and/or group-delay characteristics within effective stop bands 300s of the first filtering element 210, and the second filtering element 220 in combination with the analogue quadrature splitter 100.

Figure 4:
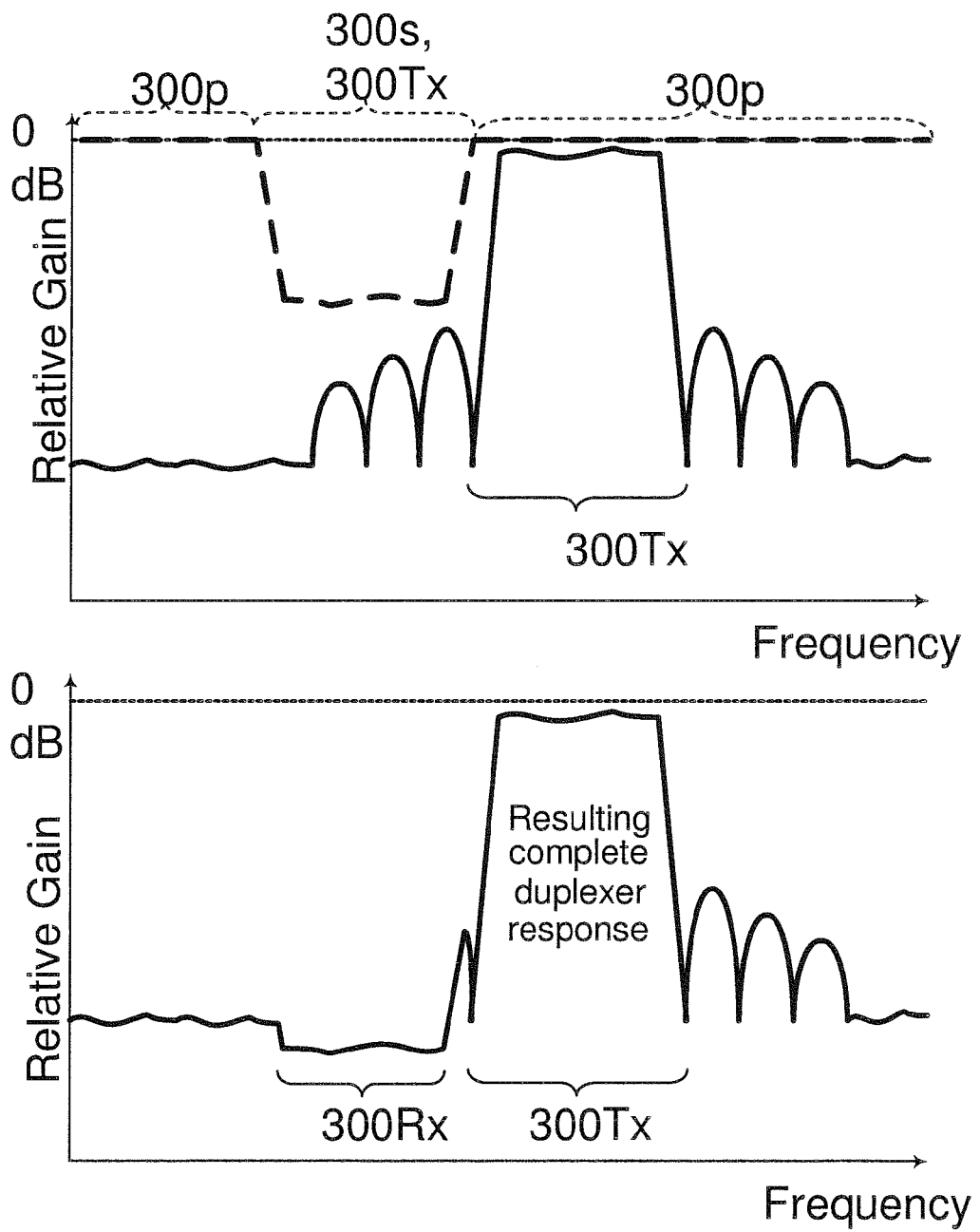
FIG. 4 shows an upper half of a filtering characteristic of transmit filters and filter elements connected to the analogue quadrature splitter. The lower half shows a resulting duplexer filtering characteristic.

FIG. 4 shows filtering characteristics of the duplexer 1 according to the present disclosure in the frequency domain. In the upper half of FIG. 4 the effective filtering characteristic of the first filtering element 210 and the second filtering element 220 in combination with the analogue quadrature splitter 100 is depicted as a dotted line. The general filtering characteristic comprises a pass band 300p followed by a stop band 300s and again followed by a second pass band 300p, from low frequencies to higher frequencies. As explained with respect to FIGS. 2b-2d, one may use a band pass filter comprising a pass band 211p, 222p in the frequency range of the affective pass band 300s as is shown as the dotted line in the upper half of FIG. 4. A filtering characteristic of the transmit filter 400T comprising a band pass within the transmit band 300Tx is depicted as a solid line. It will be apparent, that the filtering characteristics of the transmit filter 400T comprise a substantial amount of ripple closely-spaced to the pass band of the transmit filter 400T comprising the transmit band 300Tx. The substantial amount of nipple causes out of band emissions outside the transmit band 300 Tx.

It will be appreciated by a person skilled in the art that there is also a transmit filter 400T and a receive filter 400R available which are capable of providing high accuracy filtering characteristics with substantially less ripple than shown in the upper half of FIG. 4. Unfortunately such high-accuracy, high-power filtering elements are typically large in size and tend to be expensive. For applications, such as a base station of a mobile communication network, it is of interest to reduce a footprint, i.e. a size of the transmit filter 400T at the same time providing high accuracy filtering characteristics of the transmit filter 400T. The provision of the analogue quadrature splitter 100 in combination with the first filtering element 210 and the second filtering element 220, as explained above, helps to reduce the ripple within the receive band 300Rx. In the FIG. 4 it is supposed that the receive band 300Rx is disposed at a lower frequency band closely-spaced to the transmit band 300Tx. Without any limitation the receive band 300Rx may be disposed at a frequency band higher than the transmit band 300Tx. It is even conceivable that the transmit band 300Tx and the receive band 300Rx are overlapping, at least with respect to a region of transition bands of filtering characteristics, as it is the case in FIG. 4. It is also possible that the transmit and receive bands are separated, with an area of spectrum falling between them which is not allocated to transmission or reception with respect to the system under consideration, but may be allocated to a completely different system, under separate ownership or control.

The lower half of FIG. 4 displays a combined response of the duplexer 1 incorporating the general stop band 300s within the receive band 300Rx and the band pass characteristic of the transmit filter 400T comprising the pass band within the transmit band 300Tx. As can be seen from the lower half of FIG. 4 the additional ripple present in the upper half has been successfully suppressed by the general stop band 300s provided by the first filtering element 210 and the second filtering element 220 in combination with the analogue quadrature splitter 100. The relative gain within the receive band 300Rx in the lower half of FIG. 4 is substantially flat. Therefore the phase and the amplitude should be smoother than is the case for the relative gain as provided by the transmit filter 400T only, shown as solid line in the upper half of FIG. 4.

It is to be understood that the duplexer 1 of the present disclosure may be used cascading several ones of the duplexer 1. The effective filtering characteristics will improve when cascading more than one of the duplexers 1. Obviously cascading several ones of the duplexers 1 will incur an increased insertion loss with each further instance of the duplexer 1 being cascaded. Therefore a compromise between the sharp filtering characteristics and a penalty in increased insertion loss is to be found. There may very well be situations, in which the additional penalty in the insertion loss is not desirable and hence a cascading of several ones of the duplexers 1 may not be advisable.

Figure 5:
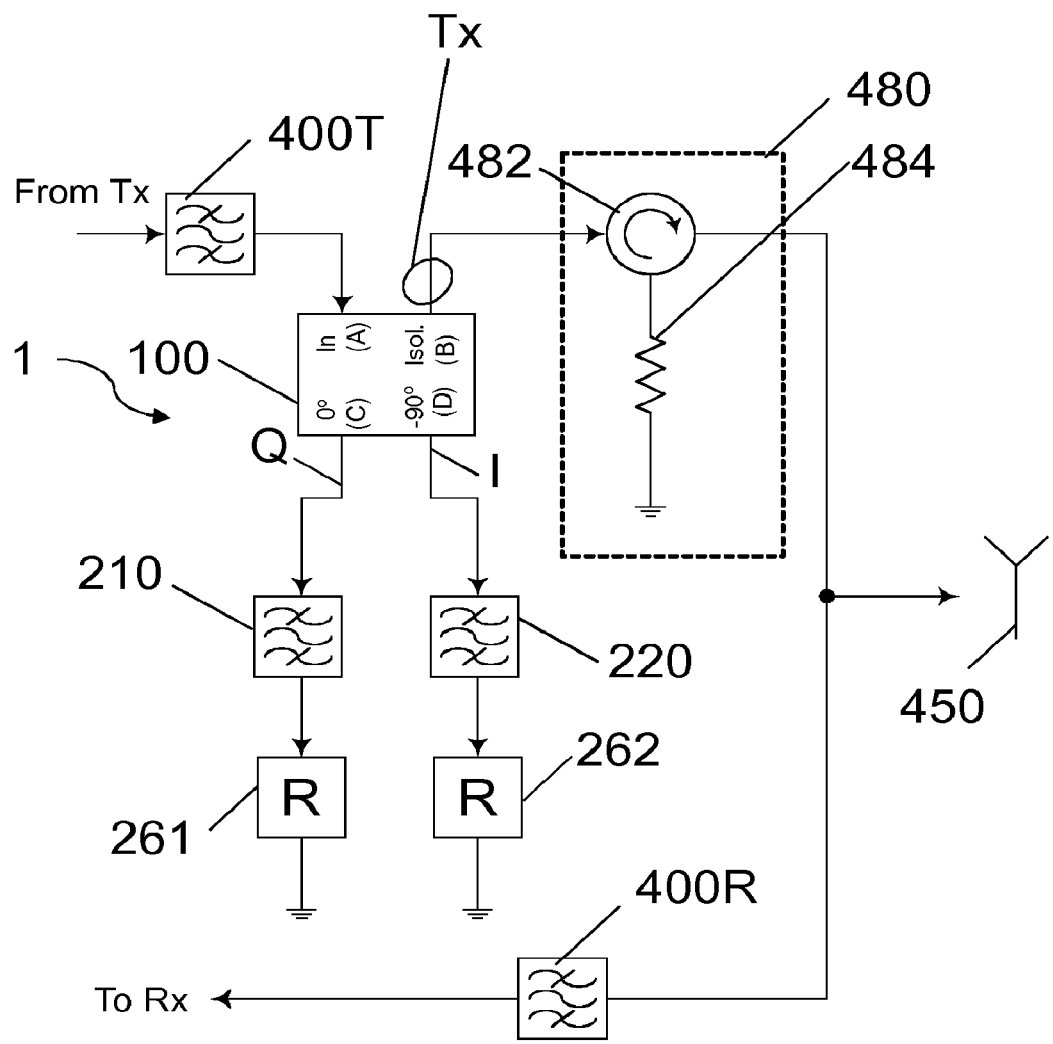
FIG. 5 shows a variant of the duplexer.

FIG. 5 shows a variant of the duplexer 1 as shown in FIG. 3a. The transmit filter 400T was moved from a position downstream of the analogue quadrature splitter 100 to a position upstream of the analogue quadrature splitter 100. Furthermore an isolator 480 is present downstream of the analogue quadrature splitter 100. The isolator 480 comprises a circulator 482 as is known in the art. The circulator 482 forwards the transmit signal Tx, leaving the analogue quadrature splitter 100 at the isolation port 120 (see FIG. 3a), to the antenna 450 in the transmit direction. A third port 483 of the circulator 482 is connected to a circulator load 484. The isolator stops the receive-band signals, which are received by the antenna, from being shorted-out by the quad-hybrid based receive band filter in the transmit path. Shorting-out the receive-band signals would prevent the receive signals from getting to and through the receive part of the duplexer 1 and would prevent the receiver from working. It will also be appreciated that providing the isolator 480 may require a larger footprint in size for the duplexer 1.

Figure 6:
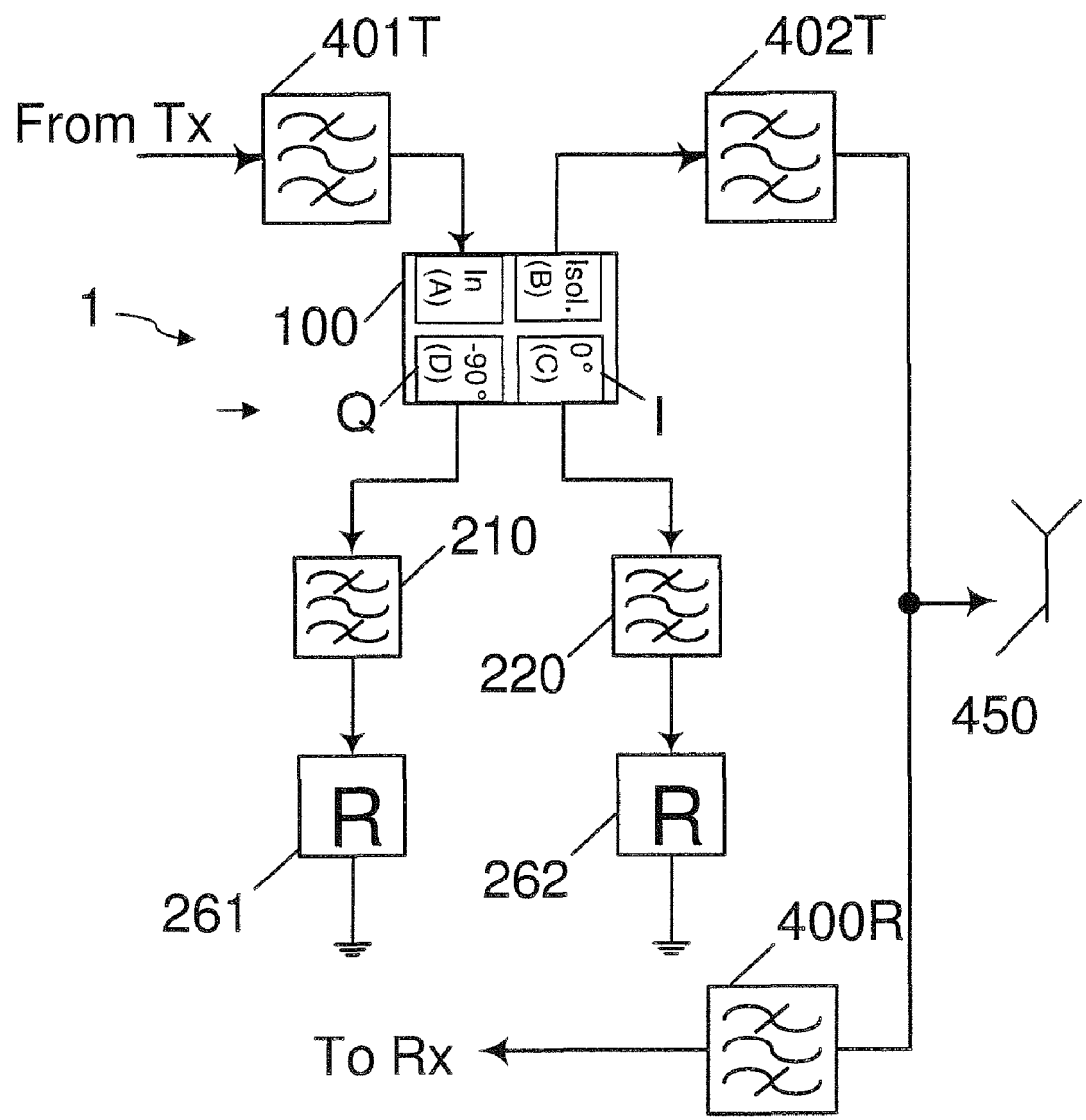
FIG. 6 shows yet a further variant of the duplexer.

FIG. 6 shows a further variant of the duplexer 1 as depicted in FIGS. 3a and 5. The duplexer 1 in FIG. 6 comprises a first transmit filter 401T at a position upstream of the analogue quadrature splitter 100 and a second transmit filter element 402T downstream of the analogue quadrature splitter 100. The first transmit filter element 401T protects the transmitter from any portion of the transmit signal Tx being reflected back into the transmitter. The second transmit filter element 402T forwards the transmit signal from the output of 110 of the analogue quadrature splitter 100 to the antenna 450 in the transmit direction. As mentioned previously the second transmit filtering element 402T stops the receive-band signals and thus ensures that the receive-band signals are not shorted-out by the quad-hybrid based receive band filter in the transmit path. Overall performance of the duplexer 1 as depicted in FIG. 6 will be substantially identical to the duplexer performance shown in FIG. 4. The duplexer 1 of FIG. 6 is a variation of the duplexer 1 of the present disclosure.

The present disclosure further provides a method for separating a transmit signal Tx and a receive signal Rx.

Figure 7A:
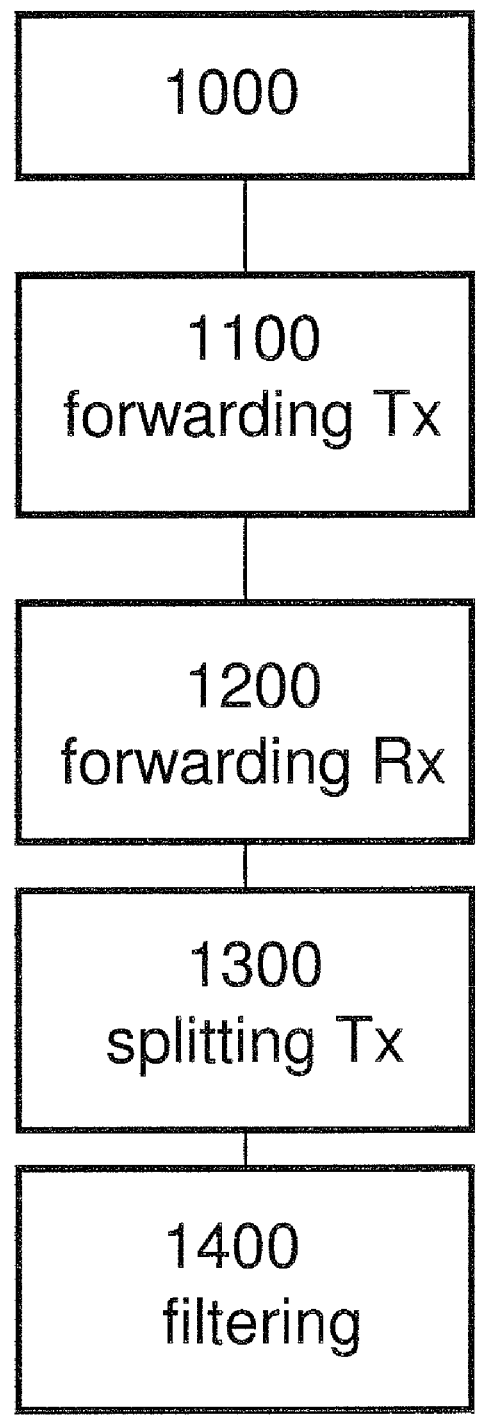
FIG. 7a shows a flow chart of the method of separating a transmit signal and a receive signal.

FIG. 7a shows a flowchart of the method 1000 for separating the transmit signal Tx and the receive signal Rx. The method comprises a step 1100 of forwarding a Tx signal. The Tx signal is forwarded within at least one of the transmit bands 300Tx in a transmit direction. As mentioned previously the transmit direction is defined as the direction from the transmitter to the antenna 450. The method further comprises a step 1200 of forwarding a receive signal Rx. The receive signal Rx is forwarded within at least one of the receive bands 300Rx in a receive direction. As mentioned previously, the receive direction is defined as the direction from the antenna 450 to the receiver (not shown). The forwarding of 1200 of the receive signal Rx may be achieved by the receive filter 400R. Likewise the forwarding 1200 of the transmit signal Tx may be achieved using the transmit filter 400T. The method further comprises a step 1300 of splitting the transmit signal Tx into an in phase component I and a quadrature component Q. In a step 1400 at least one of the in phase component I or the quadrature component Q is filtered. The filtering of the Quadrature component may be achieved using the first filtering element 210. The filtering of the in phase component I may be achieved using the second filtering element 220. The method 1000 provides an increased attenuation of the transmit signal Tx outside the transmit band 300Tx. Typically an increase of attenuation is of interest in the receive band 300Rx of the receiver, the receive band lying outside the transmit band 300Tx.

Figure 7B:
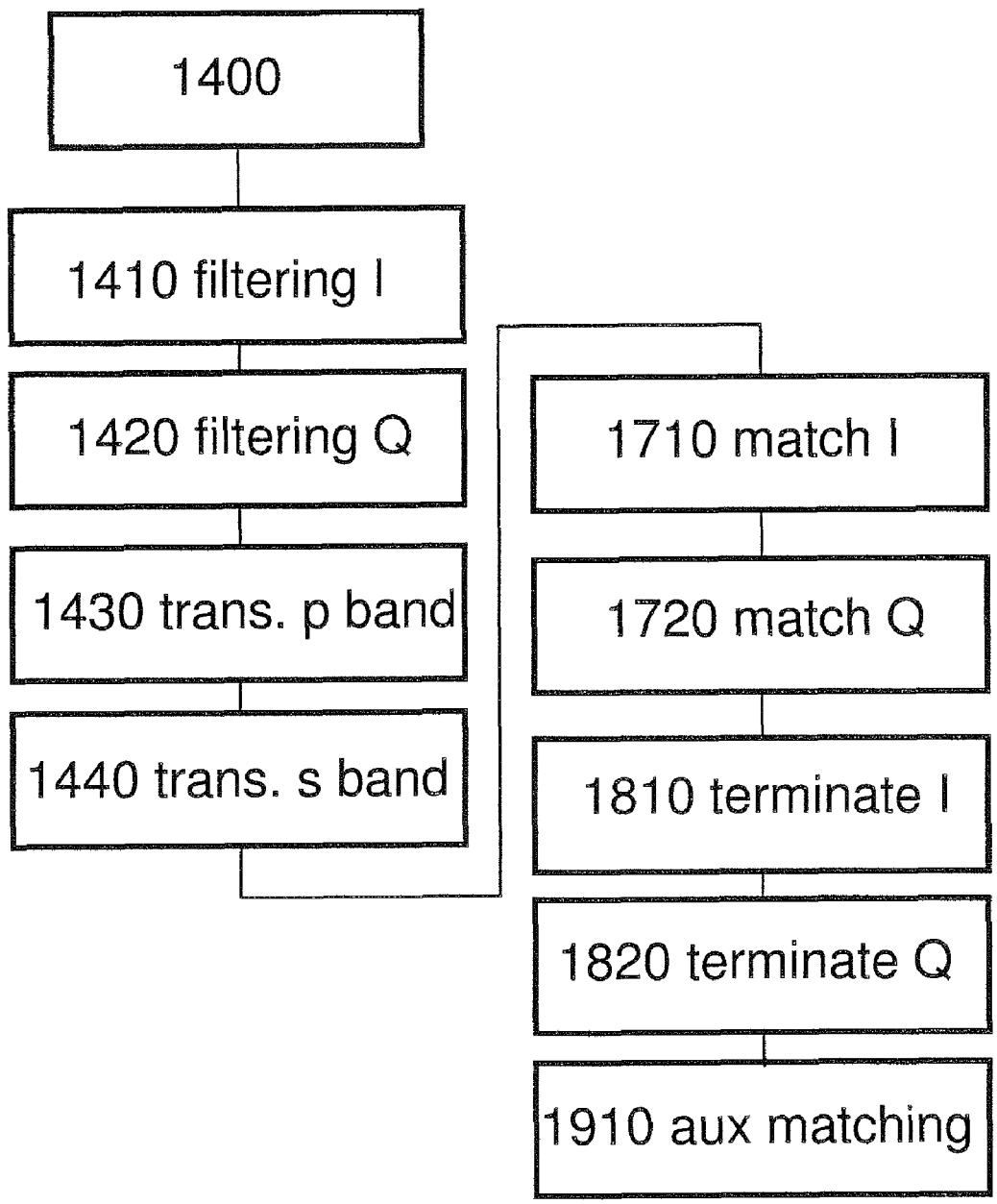
FIG. 7b shows details of a step of filtering.

FIG. 7b shows details of the step 1400 of filtering the in phase component I and/or the quadrature component Q.

In a step 1410 a filtering of the in phase component I is carried out. The filtering 1410 is according to a first pass band 211p and a first stop band 211s (see, for example, FIG. 2b). It is to be understood that the filtering 1410 of the in phase component I may comprise more than one first pass band 211p and/or more than one first stop band 211s, as for example, with a band pass filtering characteristic. In a step 1420 the quadrature component Q is filtered. The quadrature component Q is filtered according to a second pass band 222p and at least a second stop band 222s. It is to be understood that the step 1420 of filtering the quadrature component Q may comprise more than one second pass band 222p and/or more than one second stop band 222s.

A step 1430 comprises a transformation of the first pass bands 211p and/or the second pass bands 222p into at least one effective stop band 300s. The transforming 1430 comprises a substantial transforming into the affective stop band 300s. It is to be understood, that additional ripple may be caused by the substantial transforming 1430 as was discussed with respect to FIG. 4.

A step 1440 comprises a substantial transforming of the first stop bands 211s and/or the second stop bands 222s into at least one effective pass band 300p. There may be more than one first stop band 211s and more than one second stop band 222s. The step 1440 of transforming may cause additional ripple.

A step 1710 comprises an impedance matching of the in phase component I. The impedance matching of the in phase component I may be such that the in phase component I is matched to a defined load, for example, 50 ohms. In a step 1720 an impedance matching of the quadrature component Q is carried out. The impedance matching of the quadrature component Q may be, for example, to a defined load of 50 ohm. Typically in the steps 1710 and/or the 1720 of impedance matching, an impedance matching network 251, 252 may be used (see FIG. 2a).

In a step 1810 the in phase component I is terminated. The terminating of the in phase component may be into a load 261. In a step 1810 the quadrature component Q is terminated. The terminating of the quadrature component Q may be into a second load 262. In a step 1910 an auxiliary matching may be carried out. The auxiliary matching 1910 may be to an auxiliary load. The auxiliary matching may be of interest because the auxiliary matching will increase an attenuation in the effective stop bands 300s. The auxiliary matching may be of interest in order to reduce the additional ripple as discussed for the first filtering element 210 and the second filtering element 220 in combination with the effective band stop characteristic present in FIG. 4.

The present disclosure transforms high performance filtering properties of a low-cost, low-power filtering element, such as SAW filtering elements into low-cost, high power, high performance filtering characteristics.

The present disclosure further provides a computer program product comprising executable instructions for a processor enabling the processor to carry out a manufacture of the duplexer 1.

Furthermore the present disclosure provides a computer program product comprising executable instructions for a processor, enabling the processor to carry out the method for separating a transmit signal Tx and a receive signal Rx of the present disclosure.

It will be appreciated by a person skilled in the art that all those aspects of the disclosure described herein as an apparatus may at least partly be incorporated as software. The method as described herein may without any limitation be implemented as computer program and/or dedicated hardware to carry out the method. Changing from a method to a computer program and/or a dedicated piece of hardware does not depart from the spirit of the present disclosure.

While various embodiments of the present disclosure have been described above, it should be understood that they have been presented by way of example, and not limitation. It will be apparent to persons skilled in the relevant arts that various changes in form and detail can be made therein without departing from the scope of the disclosure. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present disclosure may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present disclosure should not be limited by any of the above-described exemplary embodiments, but should be defined only in accordance with the following claims and their equivalents.

The invention claimed is:

1. A duplexer for separating a transmit signal (Tx) and a receive signal (Rx), the duplexer, comprising:
    a transmit filter for substantially forwarding the transmit signal within an at least one transmit band to an antenna;
    a receive filter for substantially forwarding the receive signal within at least one receive band from the antenna to a receive path;
    an analogue quadrature splitter adapted to split the transmit signal into an in phase component and a quadrature component;
    a first filtering element with a first filtering characteristic comprising at least one first pass band and at least one first stop band;
    a second filtering element with a second filtering characteristic comprising at least one second pass band and at least one second stop band;
    wherein the analogue quadrature splitter is adapted to increase an attenuation of the transmit signal outside the transmit band and wherein the transmit filter comprises
    a first transmit filter element upstream of the analogue quadrature splitter; and
    a second transmit filter element downstream of the analogue quadrature splitter.

2. The duplexer according to claim 1, wherein the at least one transmit band and the at least one receive band are substantially closely-spaced in frequency.

3. The duplexer according to claim 1, wherein the attenuation of the transmit signal is increased in at least a portion of the receive band.

4. The duplexer according to claim 1, wherein
    the analogue quadrature splitter is adapted to substantially transform at least one of the at least one first pass band or the at least one second pass band into at least one effective stop band; and
    the analogue quadrature splitter is adapted to substantially transform at least one of the at least one first stop band or the at least one second stop band into at least one effective pass band; generating a transmit signal comprising the at least one effective stop band and the at least one effective pass band.

5. The duplexer according to claim 4, wherein the at least one effective stop band that substantially begins at an edge of the at least one transmit band and extends away from the at least one transmit band.

6. The duplexer according to claim 4, wherein the at least one effective pass band is substantially identical to the at least one transmit band.

7. The duplexer according to claim 4, further comprising at least one auxiliary termination network adapted to increase an attenuation in the at least one effective stop band.

8. The duplexer according to claim 4, wherein at least one of the at least one effective stop band or the at least one effective pass band are adapted to filter the transmit signal at a second power level at the entry of the analogue quadrature splitter; wherein the second power level is substantially higher than a first power level at which at least one of the first filtering element or the second filtering element is adapted to filter signals; and wherein the analogue quadrature splitter is operable at the second power level.

9. The duplexer according to claim 1, wherein the analogue quadrature splitter is adapted to substantially transform at least one of the first filtering characteristic comprising the at least one first pass band or the second filtering characteristic comprising the at least one second pass band into at least one effective stop band.

10. The duplexer according to claim 1, wherein the analogue quadrature splitter is adapted to substantially transform at least one of the first filtering characteristic comprising the at least one first stop band or the second filtering characteristic comprising the at least one second stop band into at least one effective pass band.

11. The duplexer according to claim 1, wherein the first filtering characteristic and the second filtering characteristic are substantially identical.

12. The duplexer according to claim 1, wherein the first filtering element and the second filtering element comprise a substantially identical response to temperature changes.

13. The duplexer according to claim 1, further comprising:
    a first impedance matching network coupled to the first filtering element; and
    a second impedance matching network coupled to the second filtering element.

14. The duplexer according to claim 1, further comprising:
    a first load for terminating the in phase component; and
    a second load for terminating the quadrature component.

15. The duplexer according to claim 1, wherein at least one of the first filtering element or the second filtering element is adapted to filter signals at a first power level.

16. The duplexer according to claim 1, wherein a power rating of at least one of the first filtering element or the second filtering element is substantially lower than the power of the transmit signal.

17. The duplexer according to claim 1, wherein the analogue quadrature splitter is implemented in strip line technology.

18. A duplexer for separating a transmit signal (Tx) and a receive signal (Rx), the duplexer, comprising:
    a transmit filter for substantially forwarding the transmit signal within an at least one transmit band to an antenna;
    a receive filter for substantially forwarding the receive signal within at least one receive band from the antenna to a receive path;
    an analogue quadrature splitter adapted to split the transmit signal into an in phase component and a quadrature component;
    a first filtering element with a first filtering characteristic comprising at least one first pass band and at least one first stop band;
    a second filtering element with a second filtering characteristic comprising at least one second pass band and at least one second stop band;

wherein the analogue quadrature splitter is adapted to increase an attenuation of the transmit signal outside the transmit band and wherein the transmit filter comprises
a first transmit filter element upstream of the analogue quadrature splitter; and
an isolator downstream of the analogue quadrature splitter, the isolator comprising:
a circulator; and
a circulator load.

19. A computer program product embodied on a non-transitory computer-readable medium and the non-transitory computer-readable medium comprising executable instructions for the execution of a manufacture of a duplexer for separating a transmit signal and a receive signal, the duplexer comprising:
　a transmit filter substantially forwarding the transmit signal within an at least one transmit band to an antenna;
　a receive filter substantially forwarding the receive signal within at least one receive band from the antenna to a receive path;
　an analogue quadrature splitter adapted to split the transmit signal into an in phase component and a quadrature component;
　a first filtering element with a first filtering characteristic comprising at least one first pass band and at least one first stop band;
　a second filtering element with a second filtering characteristic comprising at least one second pass band and at least one second stop band;
　a first transmit filter element upstream of the analogue quadrature splitter; and
　a second transmit filter element downstream of the analogue quadrature splitter wherein the analogue quadrature splitter is adapted to increase an attenuation of the transmit signal outside the transmit band.

20. A computer program product embodied on a non-transitory computer-readable medium and the non-transitory computer-readable medium comprising executable instructions for the execution of a method of separating a transmit signal and a receive signal, the method comprising:
　forwarding the transmit signal within at least one transmit band in a transmit direction through a second transmit filter element;
　forwarding a receive signal within at least one receive signal band in a receive direction;
　splitting the transmit signal into an in phase component and a quadrature component;
　filtering at least one of the in phase component or the quadrature component wherein an attenuation of the transmit signal outside the transmit band is increased and
　forwarding the transmit signal, of which at least one of the in phase component or the quadrature component has been filtered through a first transmit filter element.

* * * * *